United States Patent [19]

Kishi et al.

[11] Patent Number: 4,493,223

[45] Date of Patent: Jan. 15, 1985

[54] GEAR SHIFTING SPEED CHANGE APPARATUS FOR A ROTARY ELECTRIC TOOL

[75] Inventors: Ichiro Kishi; Hisao Nakagawa, both of Shiga, Japan

[73] Assignee: Matsushita Electric Works, Ltd., Osaka, Japan

[21] Appl. No.: 415,981

[22] Filed: Sep. 8, 1982

[30] Foreign Application Priority Data

Oct. 5, 1981 [JP] Japan .................. 56-159273

[51] Int. Cl.³ .............. F16H 3/08; F16D 21/00; E21B 3/00
[52] U.S. Cl. ...................... 74/371; 74/375; 74/369; 74/421 A; 192/48.1; 173/163
[58] Field of Search ................ 74/362, 363, 366, 369, 74/374, 375, 371, 372, 370, 357, 421 A; 81/57.31; 173/163; 192/48.91, 48.9, 20, 48.1

[56] References Cited

U.S. PATENT DOCUMENTS

| | | | |
|---|---|---|---|
| 475,735 | 5/1892 | Wright | 74/371 |
| 1,025,804 | 5/1912 | Hitchcock et al. | 74/371 |
| 1,285,370 | 11/1918 | Potts | 74/371 |
| 1,518,089 | 12/1924 | Manguen | 74/371 |
| 2,450,380 | 9/1948 | Perham | 173/163 X |
| 3,028,763 | 4/1962 | Vetsch | 74/357 X |
| 3,178,956 | 4/1965 | Stanley | 74/375 |
| 3,396,593 | 8/1968 | Moores | 74/371 |
| 3,785,443 | 1/1974 | Armbruster | 74/371 X |
| 3,827,276 | 8/1974 | Willers | 74/375 X |

FOREIGN PATENT DOCUMENTS

| | | |
|---|---|---|
| 1957234 | 5/1971 | Fed. Rep. of Germany |
| 2511469 | 9/1976 | Fed. Rep. of Germany |
| 2936996 | 4/1981 | Fed. Rep. of Germany |
| 466001 | 1/1969 | Switzerland |
| 546515 | 3/1974 | Switzerland |

Primary Examiner—Allan D. Herrmann
Assistant Examiner—Arthur T. Quiray
Attorney, Agent, or Firm—Stevens, Davis, Miller & Mosher

[57] ABSTRACT

A gear shifting speed change apparatus for a rotary electric tool such as a drill having an electric motor driving a first pair of unequal diameter pinion gears which are in continuous driving engagement with a second pair of pinion gears. The gears of second pair are independently mounted next to each other for free rotation on a shaft having an axial keyway. An axially sliding key is manually shifted to engage either one, but not both, of the second pair of gears by means of a pair of projections extending radially outwardly from the sliding key, one projection being axially outside the outer face of each gear and engageable with a recess in the outer face of the adjacent gear.

8 Claims, 13 Drawing Figures

GEAR SHIFTING SPEED CHANGE APPARATUS FOR A ROTARY ELECTRIC TOOL

INTRODUCTION

This invention pertains to electric tools and more particularly to tools such as an electric drill having a speed reduction gear unit between the motor and the chuck. It is often desirable to change the gear reduction ratio depending upon the type of drill bit, the material being drilled or when the tool is used to power other accessories such as a sanding disk.

RELATED PRIOR ART

Japanese patent publication No. 54344/81 laid open to public inspection on May 2, 1981, see FIG. 2 thereof.

BRIEF SUMMARY OF THE INVENTION

The present invention utilizes a first pair of pinion gears of dissimilar diameter turning together on a common shaft driven by an electric motor. This first pair drives a second pair of pinion gears mounted for independent rotation on a common shaft having a keyway. The second pair of gears can be driven, one at a time, by an axially slidable key mounted in said keyway and having a pair of projections which alternatively engage recesses on the axial outer faces of the second pair of gears. It is an object of this invention to facilitate such gear shifting speed change in an apparatus which is compact and also avoid locking or stripping of the gears. Other objects and advantages will become apparent from the following.

The following is a description of a preferred embodiment of the present invention, which is given by way of example and not of limitation.

Figure 1:
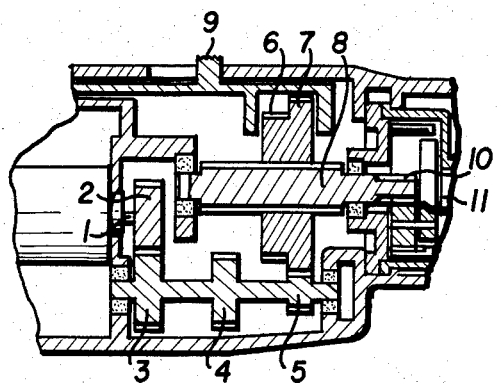
FIG. 1 is a longitudinal cross sectional view of a prior art speed change apparatus.
Figure 2:
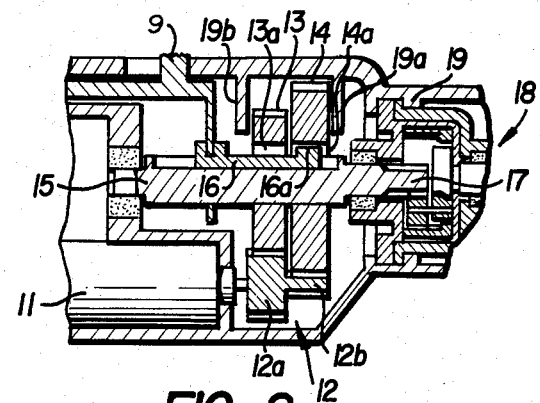
FIG. 2 is a view similar to FIG. 1 of an improved prior art speed change apparatus.

A conventional prior art speed change apparatus is shown in FIGS. 1 and 2. In FIG. 1, a pinion 2 transmits rotation of a motor shaft 1 to a gear 3 and then to speed change pinions 4 and 5 provided coaxially therewith. Speed change gears 6 and 7, which are engageable with the speed change pinions 4 and 5, are integral with each other and mounted for rotation with intermediate shaft 8 by means of a spline or keyway. Gears 6 and 7 can be manually moved axially along shaft 8 by a speed change handle 9. The speed change handle 9 may be moved horizontally in reciprocation to engage speed change gear 6 with the speed change pinion 4 or speed change gear 7 with the speed change pinion 5 thereby to change the gear ratio and the speed of rotation. Intermediate shaft 8 has a pinion 10 through which the driving force is transmitted to a speed reduction mechanism 11 in the next stage.

The speed changing apparatus shown in FIG. 1, however, is structurally larger in the area between the speed change pinions 4 and 5 making it difficult for close coupled connection of pinions 4 and 5 with the motor so that if one desires to go to a three speed gearing an axially longer transmission will result. When the teeth of the pinions and gears are not well matched in relation to each other during speed change gear-switching, the tips of teeth do not contact each other smoothly and changeover of the gears during rotation of gears is impossible. Also, the tips of teeth may occasionally clash and be broken.

FIG. 2 shows an improvement in the speed change apparatus of FIG. 1, in which a motor 11a transmits its rotation to its pinion 12, the pinion 12 comprising a large pinion 12a and a small pinion 12b which are integral and continuously engaged with speed change gears 13 and 14 which are fitted onto an intermediate shaft 15 which must rotate with one of the gears 13 or 14. A key 16 is fitted slidably into a groove in intermediate shaft 15 and operated by a speed change handle 9. The speed change gears 13 and 14 have keyways 13a and 14a alternatively engageable with the key 16 respectively so that either speed change gear 13 or 14 is in engagement with projection 16a through axial movement of key 16. Thus the engaged gear rotates integrally with the intermediate shaft 15 thus transmitting thereto the rotation. A pinion 17 at the distal end of intermediate shaft 15 transmits the rotation thereof to a speed reduction mechanism 18 in the next stage.

Such a speed changing apparatus, however, presents difficulty in that the keyways 13a and 14a of the transmission gears 13 and 14 must be positioned in alignment with each other in order to move the key 16 for engaging with each gear, whereby, if the keyways 13a and 14a are not aligned, or if the key 16 is not moved carefully, it will result in difficulty for a smooth speed change. When the key 16 is positioned across both the gears 13 and 14, it will make it impossible to change over the gears during the rotation because both the gears always engage with a large pinion 12a and a small pinion 12b respectively. Because the gears 13 and 14 are restricted in axial movement by walls 19a and 19b projecting from the outer wall 19, the gears 13 and 14 cannot avoid sliding contact with walls 19a and 19b during the operation of the apparatus, leading to increased noise and friction.

DETAILED DESCRIPTION OF A PREFERRED EMBODIMENT

In the light of the above problem, the present invention has been designed. An object of this invention is to provide a speed change apparatus for a rotary electric tool which is capable of reliably changing over the speed change gears even during rotation thereof.

In this invention a pair of speed change gears is fitted in side by side juxtaposition on a shaft, these gears each having on their axial outer surfaces a recess which is engageable selectively with one of a pair of spaced apart projections on a slide key. The interval between the pair of projections is larger than the axial length of the shaft occupied by both the gears, in other words, the distance between the axially outer sides of the gears. Hence, when the slide key is moved in one direction, one projection engages with the recess on the outer surface of the gear opposite to the key and the other projection reliably disengages from the projections of the other gear, whereby the apparatus of the invention avoids a locking condition and ensures a smooth gear changeover. Also, the slide key can be in a condition of engaging with neither of gears, thereby facilitating gear changeover during the rotation of gears.

An electric tool utilizing an embodiment of the invention is shown in FIGS. 3 through 10. This electric tool has a pistol-like shaped housing 20 which can be opened widthwise into two approximately equal halves. A battery pack 22 having a storage battery is detachably held in the pistol grip portion 21 of housing 20 via a lower opening 21a so that a battery terminal 23 and a contact terminal 24 electrically contact each other. The grip portion 21 has at its front side, an on-off switch for the power source and a rotation reversing switch 26 so that electric power is fed to motor 28 in main body 27 through the switches 25 and 26.

A motor 28 is disposed at the rearwardly lower portion of the main body 27 of the trunk of the tool and a speed change handle means 29 is disposed at the rearwardly upper portion and above the motor 28. A speed change gear train 30 is disposed at an intermediate portion of main body 27, a speed reduction unit 31 connected to the speed change gear train 30 is disposed at the front end of body 27, and a chuck 32 projects outwardly from the body 27 and is connected to the speed reduction unit 31. A double-geared pinion 34 is fixed to motor shaft 33 of motor 28.

Figure 3:
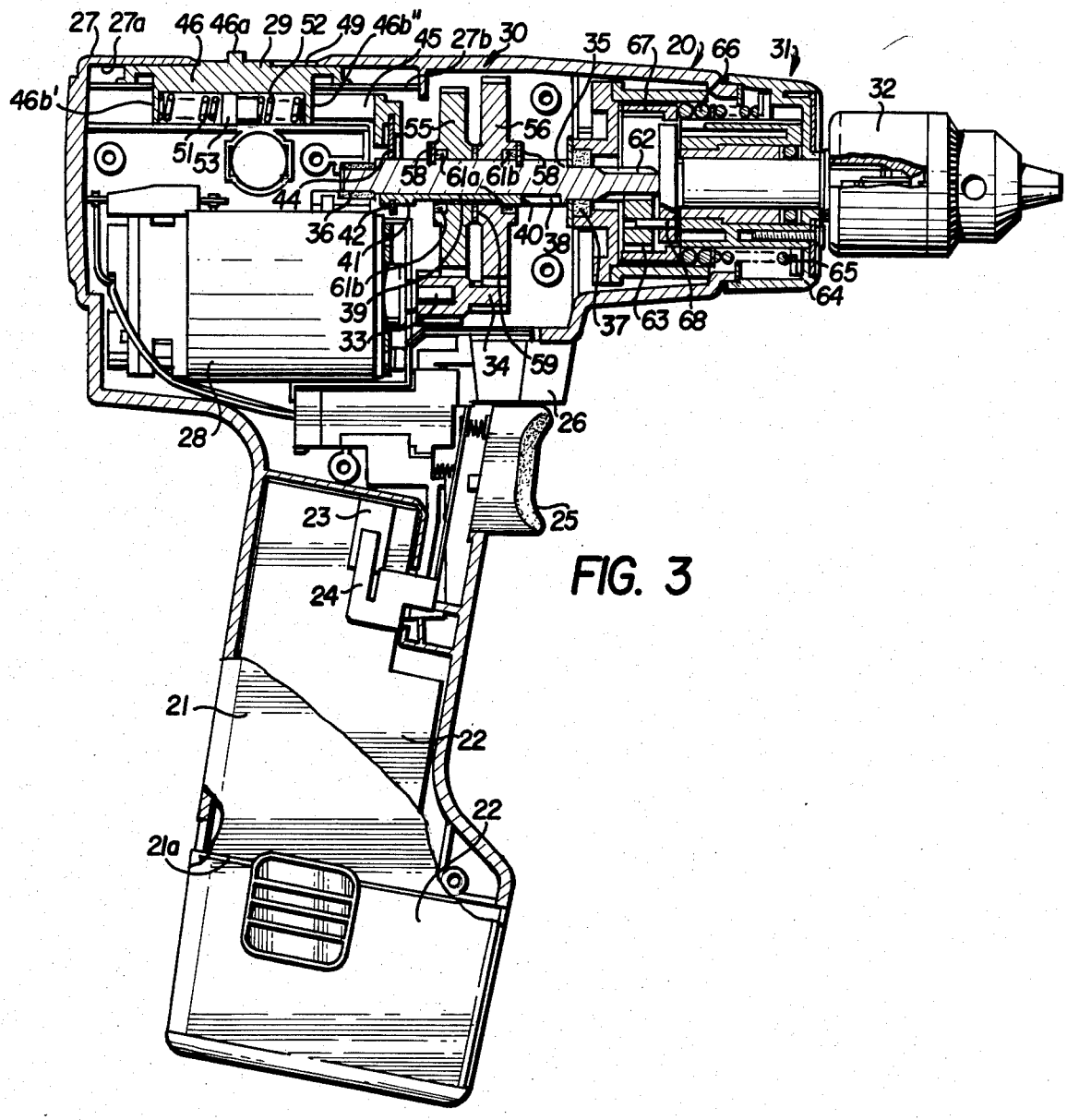
FIG. 3 is a longitudinal cross sectional view of an electric drill including the gear shifting speed changing apparatus of the present invention.
Figure 4:
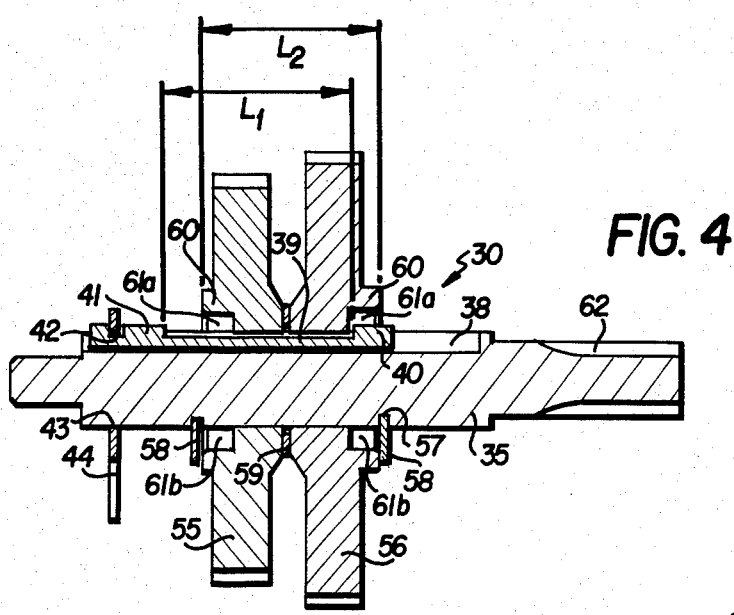
FIG. 4 is an enlarged partial sectional view of the speed change apparatus shown in FIG. 3.

Referring now to FIGS. 3 and 4, an intermediate shaft 35 of gear train 30 is parallel to the motor shaft 33, disposed at the axial center of the body 27, and rotatably supported at its axial ends to the body 27 through bearings 36 and 37. A keyway 38 is formed in intermediate shaft 35 and a slide key 39 is inserted slidably into the keyway 38, the slide key 39 having at its ends a pair of projections 40 and 41 spaced at a fixed interval $L_1$ and radially projecting, at its highest point, higher than the surface of intermediate shaft 35, but being of smaller or equal diameter to shaft 35 on the portion between the projections 40 and 41.

Figure 5:
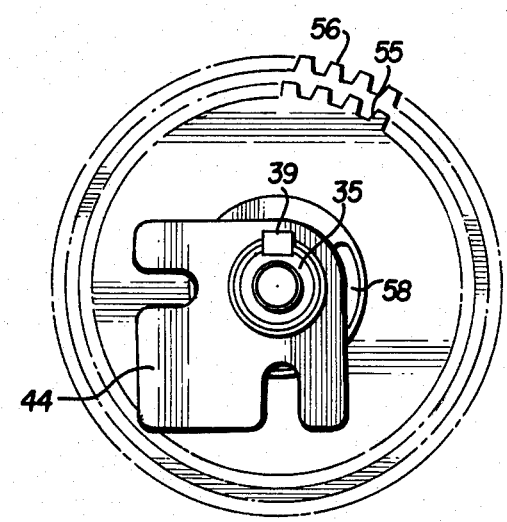
FIG. 5 is a left end view of the apparatus of FIG. 4.
Figure 6:
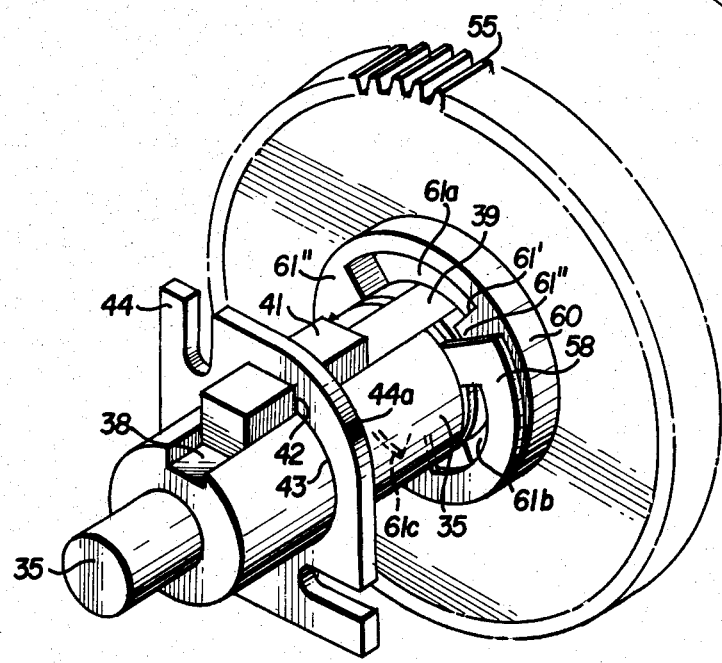
FIG. 6 is a perspective view of the apparatus of FIG. 4.

A ring mounting groove 42, as shown in FIGS. 4 to 6, is formed at the rear end portion of the slide key 39 and a movable ring 44 having a bore 43, large enough to fit onto intermediate shaft 35, is fitted into groove 42 so that the shaft 35 and slide key 39 are rotatable with respect to the ring 44. Also, the movable ring 44 has a circular arc portion on its outer periphery which is fitted into a mounting groove 45a (see FIG. 8) on one end of a transmission lever 45 and is integral therewith. The transmission lever 45, as shown in FIG. 3, is disposed at the rear portion of body 27 parallel to the intermediate shaft 35 and supported for slidable axially movement and has as its other end a right angble offset portion 47 opposite to the central lower portion of speed change handle 46. The offset portion 47 has at its distal end a vertical portion 48 having at its end engaged into speed change handle 46.

Figure 8:
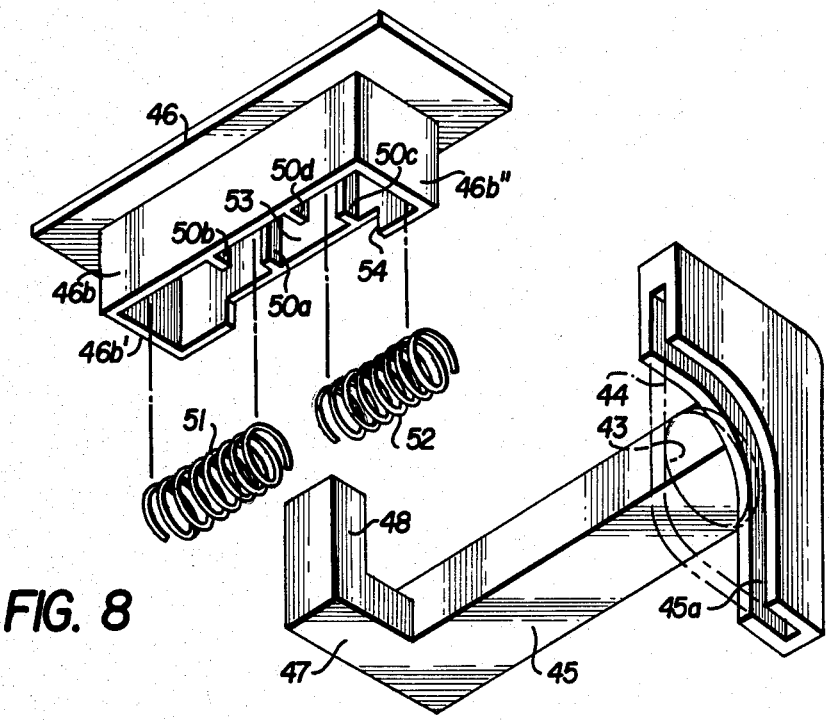
FIG. 8 is a perspective exploded view of the speed change handle and linkage members.
Figure 9:
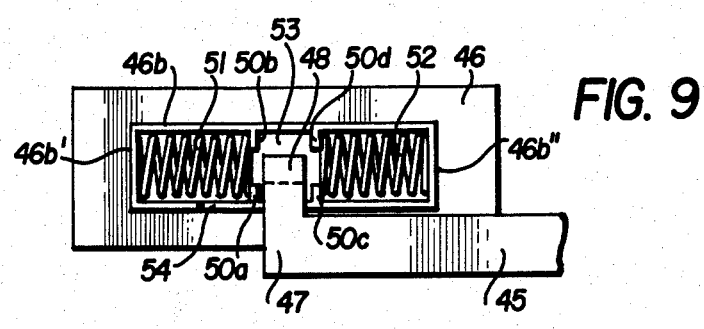
FIG. 9 is a bottom view of the speed change handle of FIG. 8.

The speed change handle 46 has at its upper surface a knob 46a projecting from body 27 through a slit 49 and is supported for freely slidable movement in relation to inner surface 27a of body 27 and a guide 27b mounted thereon, thus being movable parallel to intermediate shaft 35. Referring to FIG. 8, at the lower surface of speed change handle 46 there is a box-like shaped spring-housing 46b open at its lower end, the housing 46b having at the central portion four ribs 50a through 50d. Coil springs 51 and 52 are interposed in compressed condition with opposite ribs 50a and 50b on one end of spring 51 and end wall 46b' on the other end thereof. Similarly spring 52 is between the opposite ribs 50c and 50d on one end and the other end wall 46b''. The coil springs 51 and 52 oppose each other with the ribs 50a through 50d forming a space 53 between the springs. Also, a guide cutout 54 is formed at the lower edge of one side wall of spring-housing 46b (FIG. 8). The horizontal portion 47 of transmission lever 45 is fitted crosswise into the guide cutout 54 and guided therewith and the vertical portion 48 is positioned within the space 53 between the coil springs 51 and 52. Hence, the speed change handle 46, when sliding in one direction, allows the guide cutout 54 smoothly to slide without hindrance by the horizontal portion 47 with vertical portion 48 to being between the ribs 50a and 50b or 50c and 50d. As a result, one end of coil spring 51 or 52 biases the lateral surface of vertical portion 48 and pushes the transmission lever 45 in the sliding direction of the handle 46 so that movement of the transmission lever 45 moves ring 44 axially along intermediate shaft 35, thereby sliding the slide key 39 along keyway 38 of intermediate shaft 35.

Figure 7:
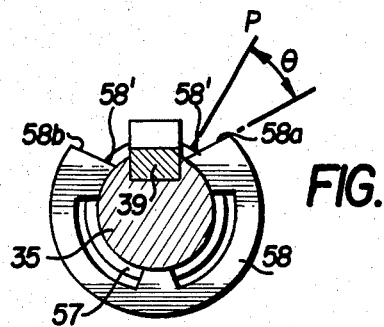
FIG. 7 is a sectional view through shaft 35 of FIG. 6 adjacent snap ring 58.

On shaft 35 between projections 40 and 41 of the slide key 39 are rotatably fitted a pair of speed change gears 55 and 56 within the range of axial length $L_2$ between the outermost surfaces of the gears 55 and 56, length $L_2$ is shorter than the aforesaid interval $L_1$, which as shown in FIG. 4 is between the projections 41 and 42. The speed change gears 55 and 56 are restricted from moving in the axial direction, by virtue of a pair of snap rings 58 fitted into a pair of circumferential grooves 57 in intermediate shaft 35, thereby insuring continuing engaging of gears 55 and 56 with double-geared pinion 34. Each circumferential groove 57, as shown in FIG. 7, is cut radially into shaft 35 (closer to the central axis of intermediate shaft 35) so that its bottom is deeper than the upper surface of the intermediate portion of slide key 39 when in place. The speed change gears 55 and 56, which are different from each other in their reduction gear ratio have interposed between them a washer 59, and each have, at their respective axial outer end surfaces, a ring-like shaped projection 60. Three sectorial recesses 61a through 61c (FIGS. 4 and 6) are formed at the axially outer sides (perpendicular to the intermediate shaft 35) of each projection 60 and the projection 40 or 41 of the slide key 39 may be fitted into one of the recesses 61a to 61c by virtue of sliding movement of slide key 39 in the keyway 38 and retained against the inner surface 61' of the respective recesses 61a to 61c, thereby transmitting the rotation of speed change gear 55 or 56 to the intermediate shaft 35. Each snap ring 58, as shown in FIG. 7, is formed of a C-like shaped E-ring, abuts the peripheral portion against the outside of ring-like shaped projection 60, and is slanted at both ends 58a and 58b. toward the opening side with respect to the radial direction P at an angle of $\theta$, so that an area of the inner edge 58' of each end 58a or 58b of snap ring 58 which may be in contact with one lateral side of slide key 39 is at a minimum, thereby not hindering the slide key 39 from sliding movement.

The speed reduction unit 31 is so constructed that pinion 62 on the distal end of intermediate shaft 35 transmits its rotation to a planetary gear 63, (see FIG. 3) and a coil spring 65 supported by a torque adjusting thumb nut 64 supports an inner teeth gear 67 through balls 66 so that the planetary gear 63 rotates the inner teeth gear 67, and the chuck 32 rotates at a reduced speed through a pin 68 of planetary gear 63 connected eccentrically to the chuck 32.

Figure 10A:
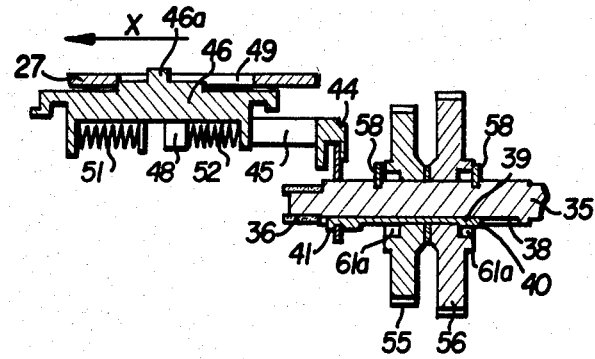
FIGS. 10(a)-10(d) is a longitudinal section view of the speed change mechanism of FIG. 4 showing various steps of the speed change operation.
Figure 10B:
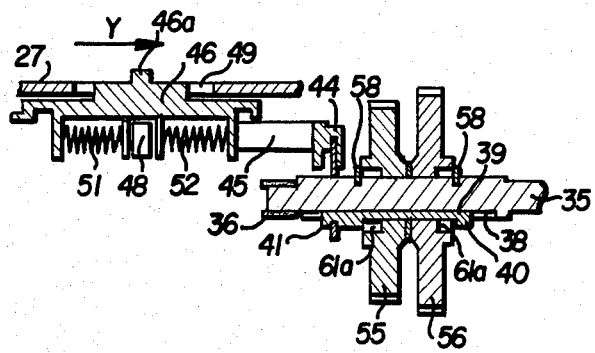
Figure 10C:
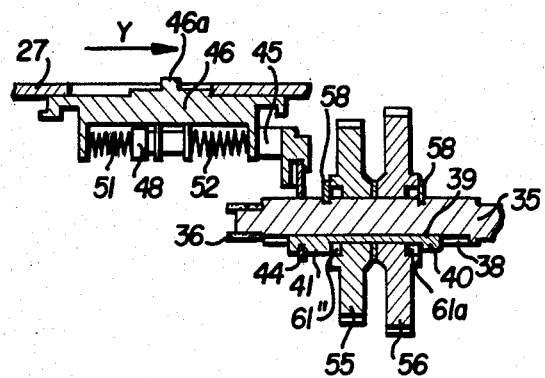
Figure 10D:
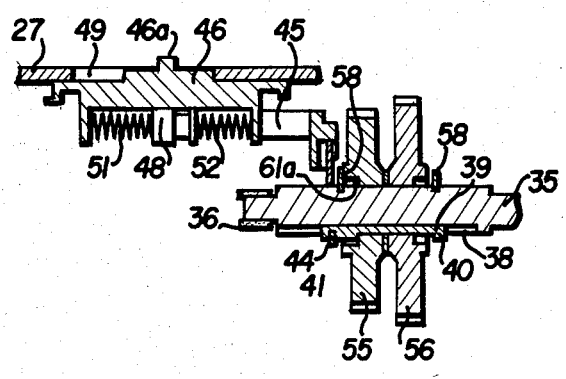

Next, explanation will be given concerning the speed changing operation of this electric tool. Upon operating the switches 25 and 26, the motor shaft 33 of the motor 28 rotates in the predetermined direction, and the speed change gears 55 and 56 rotate through the pinion 34. In FIGS. 3 and 10(a), the speed change handle 46 is moved in the direction of the arrow X as shown to move the projection 40 of slide key 39 into the recess 61a at the speed change gear 56. Hence, the intermediate shaft 35 rotates at low speed through the rotation of speed change gear 56 and transmits its rotation to the chuck 32 through the speed reduction unit 31. FIG. 10(b) shows the speed change handle 46 in the process of sliding in the direction of the arrow Y in the drawing, in which the coil spring 51 biases the vertical portion 48 of transmission lever 45 so that the projection 40 of slide key 39 moves, via movable ring 44, away from the recess 61a of speed change gear 56, thereby transmitting no rotation therefrom to the intermediate shaft 35. At this time, the projection 41 of slide key 39 engages with none of recesses 61a to 61c of speed change gear 55 due to the relation $L_1$ greater than $L_2$ as shown in FIG. 4, whereby the intermediate shaft 35 stops its rotation. FIG. 10(c) shows the speed change handle 46 in a condition of moving further in the direction of the arrow Y, in which case the projection 41 of slide key 39 has not yet engaged with any one of recesses 61a to 61c so as to abut against one projecting portion 61" between the respective recesses 61a to 61c. Thus in the FIG. 10(c) position coil spring 51 is compressed and as the speed change handle 46 is moved to arrive the right hand position, it keeps the slide key 39 in biased contact with the speed change gear 55 via compressed spring 51, through transmission lever 45 and movable ring 44. In FIG. 10(d), the projection 41, after the speed change gear 55 rotates, engages with any one of recesses 61a to 61c through a restoring action of coil spring 51, so that the rotation of gear 55 is transmitted to the intermediate shaft 35 through the slide key 39, thus rotating the chuck 32 at high speed. In addition, when the speed change handle 46 is then moved in the direction of the arrow X to change over the slide key 39 to the speed change gear 56, the same operation as the above, but in the opposite direction, is performed.

As seen from the above, the speed change apparatus of the rotary electric tool of the invention provides a pair of speed change gears fitted between the projection of the slide key and the recesses on the outer surface of the respective gears and engageble with the projections, thereby being advantageous in ensuring the changeover operation of the gears and enabling the changeover of the gears even during the rotations thereof. In the embodiment shown in FIG. 7, the "C" shaped snap ring 58 having both ends 58a and 58b slanted each at an angle of θ is fitted into the circumferential groove 57 of the intermediate shaft 35 so that the slide key 39, in such condition, is thrust-supported in the keyway 38, whereby the apparatus of the invention is simple in construction and can reduce noise and power loss in comparison with the prior art.

What is claimed is:

1. A gear shifting speed change apparatus for a rotary electric tool comprising:
   a shaft having an axially extending keyway therein with a gear changing slide mounted for axial movement in said keyway;
   said gear changing slide having a pair of axially spaced apart projections which extend radially outwardly beyond an outer periphery of said shaft;
   a pair of speed change gears mounted on said shaft and freely rotatable in relation thereto, an axial distance between axially outer faces of said gears being less than an axial distance between said slide projections;
   means to limit axial movement of said gears in relation to said shaft;
   at least one axially inwardly extending recess on each said gear outer face;
   means for axially sliding said gear changing slide in said keyway by using spring force so as to engage a recess of one of said gears and secure it for rotation with said shaft.

2. The apparatus of claim 1 in which at least part of the means to limit axial movement of the gears is on said shaft.

3. The apparatus of claim 2 in which the limiting means is at least one "C" shaped washer on said shaft and secured against axial movement, said washer having an opening through which said slide may pass.

4. The apparatus of claim 2 in which the limiting means is at least one "C" shaped snap ring mounted in a circumferential groove adjacent an axial outer face of a gear, said snap ring having an opening through which said slide may pass; edges of the snap ring defining said opening forming an angle with respect to a radius line projected from the center of said shaft so as to present a minimum contact area for a slide projection within said opening.

5. The apparatus of claim 4 in which said circumferential groove is radially cut into the shaft so that its bottom is deeper than the outer surface of an intermediate portion of the slide.

6. The apparatus of claim 1 in which the means for axially sliding said gear changing slide in said keyway comprises a handle accessible from the exterior of the tool and a linkage to said slide permitting rotary motion of said slide and shaft but controlling axial movement of said slide in relation to said shaft.

7. The apparatus of claim 1 in which the means for axially sliding said gear changing slide in said keyway comprises a ring having an opening for said shaft but permitting said shaft to rotate in relation thereto; a groove in said slide engaged by said ring to control axial movement of said slide but permitting full rotation of said slide in relation thereto; and linkage means extending from said ring to a handle accessible from the exterior of the tool.

8. The apparatus of claim 7 in which the handle has at least one spring means for biasing the linkage means so that a projection of said slide will be biased toward axial movement into and out of one of said recesses in a gear.

* * * * *